May 3, 1938. H. S. LENHART 2,116,075
INDICATOR
Filed Nov. 28, 1936 2 Sheets-Sheet 1

INVENTOR
H. S. LENHART
BY
ATTORNEYS

May 3, 1938.   H. S. LENHART   2,116,075
INDICATOR
Filed Nov. 28, 1936    2 Sheets—Sheet 2

INVENTOR
H. S. LENHART
BY
ATTORNEYS

Patented May 3, 1938

2,116,075

UNITED STATES PATENT OFFICE 2,116,075

INDICATOR

Herbert S. Lenhart, Allentown, Pa., assignor to Fuller Company, a corporation of Delaware Application November 28, 1936, Serial No. 113,099

13 Claims. (Cl. 200—92)

This invention relates to indicators or electrical switch actuating devices and more particularly to indicators for use in connection with bins for the storage of pulverulent materials, to open or close electrical circuits when the stored material reaches, or falls below, a predetermined level. The indicator may be used, for example, in storage bins for pulverized coal, cement, lime, starch and other materials having similar physical characteristics, to open or close signal circuits and circuits controlling elements of pulverulent material conveying systems.

Pulverulent materials have two peculiar characteristics which contribute to the difficulties of obtaining accurate indications of the actual quantity of material in storage. When delivered to the bin, they are frequently in an aerated state, created deliberately or accidentally, and are so fluent that they surge and splash. As the entrained air escapes, the level falls a considerable distance and frequently the material assumes steep angles of repose, exerting little lateral thrust. Secondly, when withdrawals are made from a bin, and particularly one having a flat bottom, materials flow simultaneously from substantially all levels, forming "pipes" or "rat-holes" directly above the discharge opening, or openings, each pipe being generally an inverted cone having steep sides.

These characteristics of pulverulent materials frequently cause indicators of previous types to give false signals and, when an indicating device is used to control the operation of conveyors, or the branch line valves of pneumatic conveyor systems, over-flow of a bin may result. This is especially hazardous when combustible dusts, such as starch and pulverized coal, are handled. Previous types of indicators may be divided generally into two classes, one actuated by a diaphragm which responds to lateral thrust of material, usually in opposition to a spring or counter-weight which returns it to its original position, the other employing a paddle or plate suspended from a pivot, whereby lateral flow deflects the paddle and actuates the switches. With both types, surging or splashing of material in a partly filled bin may actuate the switches prematurely. If the material is substantially aerated, ultimate settling may release the diaphragm or paddle and indicate that the bin is in condition to receive material. Frequently the settling of material will relieve lateral thrust and permit return of the diaphragms or paddles even though they remain below the material level.

It is, accordingly, among the purposes of this invention to provide an indicator or electrical switch actuating device which overcomes the difficulties described above, and is positive and reliable in operation. It is a further purpose to provide an indicator that will neither respond prematurely to actuate the switch mechanism nor return the switch mechanism to an original position following settling of previously aerated material. For these purposes, means are provided to permit a lag or interval between the time when the device responds to the presence of material and the actuation of the switch mechanism. This lag or interval is preferably made variable to compensate for the extent of settling of the material, in accordance with its rate of delivery to the bin and its degree of aeration.

In general, the present apparatus comprises a motor-driven paddle, the latter being driven at a low speed and adapted for location within a storage bin and having a surface of sufficient size to arrest rotation of the paddle shaft when the paddle is buried in material. The stator frame of the motor is supported for limited movement from an initial position, which it occupies when the level of material in storage is below the paddle. Movement from the initial position is restrained, as by the opposition of a spring of lower tension than the torque of the motor. When however, the rotation of the paddle is arrested by material, the stator frame moves to another limiting position and engages switch actuating mechanism to open or close appropriate electrical circuits. At this time the motor is preferably de-energized, but the stator frame remains at the new position because the spring does not have sufficient force to rotate the speed reducer. When the level of material falls, due to withdrawal of material from the bin, the paddle is released and the spring returns the stator frame to its initial position, thereby releasing the switch actuating mechanism. The switch actuating mechanism is preferably so positioned that a substantial movement of the stator frame may be provided for before the parts are engaged to actuate the switch or switches, the degree of movement between limiting points preferably being made adjustable to vary the interval.

Any self-starting motor and speed reducer of high ratio will serve the general purposes but I prefer to employ a self-starting synchronous motor provided with a built-in speed reducer of the type commonly employed in electric clocks, as this type is reliable in operation, may be procured at low cost, consumes little power and the speed reduction ratio is satisfactory. This type is also desirable because such motors are ordinarily furnished with enclosed speed reducers to exclude dust and require little or no attention. The low speed of the assembly, 1 R. P. M., makes the apparatus readily responsive to the presence of material. The more common commercial types of electric clock motors are designed to operate in a horizontal position, as the lubricating oil is sealed within the casing enclosing the speed reducer below the shaft opening. For this reason the motor and speed reducer assembly is preferably supported for partial revolution about the axis of the paddle shaft, which is preferably vertically suspended, the shaft being driven at right angles through miter gears.

The switch mechanism preferably includes at least one switch having the characteristics of a single pole double throw switch so that a circuit or circuits may be opened and closed at both limiting positions of the stator frame. This arrangement not only permits the motor to be continuously energized when the stator frame is in its initial position, and up to any position selected for movement of the switch, together with any signal or other circuits which the user desires to maintain until material reaches a predetermined level, but also permits the opening of the power circuit to the motor, when the switch is actuated by movement of the stator frame, and the opening or closing of other appropriate circuits at that time. I have found that a "micro" snap switch of the type disclosed in U. S. Patent No. 1,960,020 is satisfactory for the purpose, with respect to current capacity and the limited power and movement required to operate it.

In order to provide for the interval, described above, between the initial movement and the actuation of the switch, the latter may be located so that various degrees of partial revolution are required before the contact is made, and preferably the mounting of the switch is made adjustable to vary the interval. Contact of the switch actuating mechanism is preferably made by a cam secured to the motor or its support, the position of the cam also being made adjustable so that the interval may be further varied. Since the preferred type of speed reducer operates at 1 R. P. M., the revolution of the stator frame about the axis of the shaft is at the same rate, and it will be understood that the lag in seconds corresponds to the arc through which the stator frame revolves between its two limiting points.

For a better understanding of the invention reference is made to the accompanying drawings in which.

Figure 1:
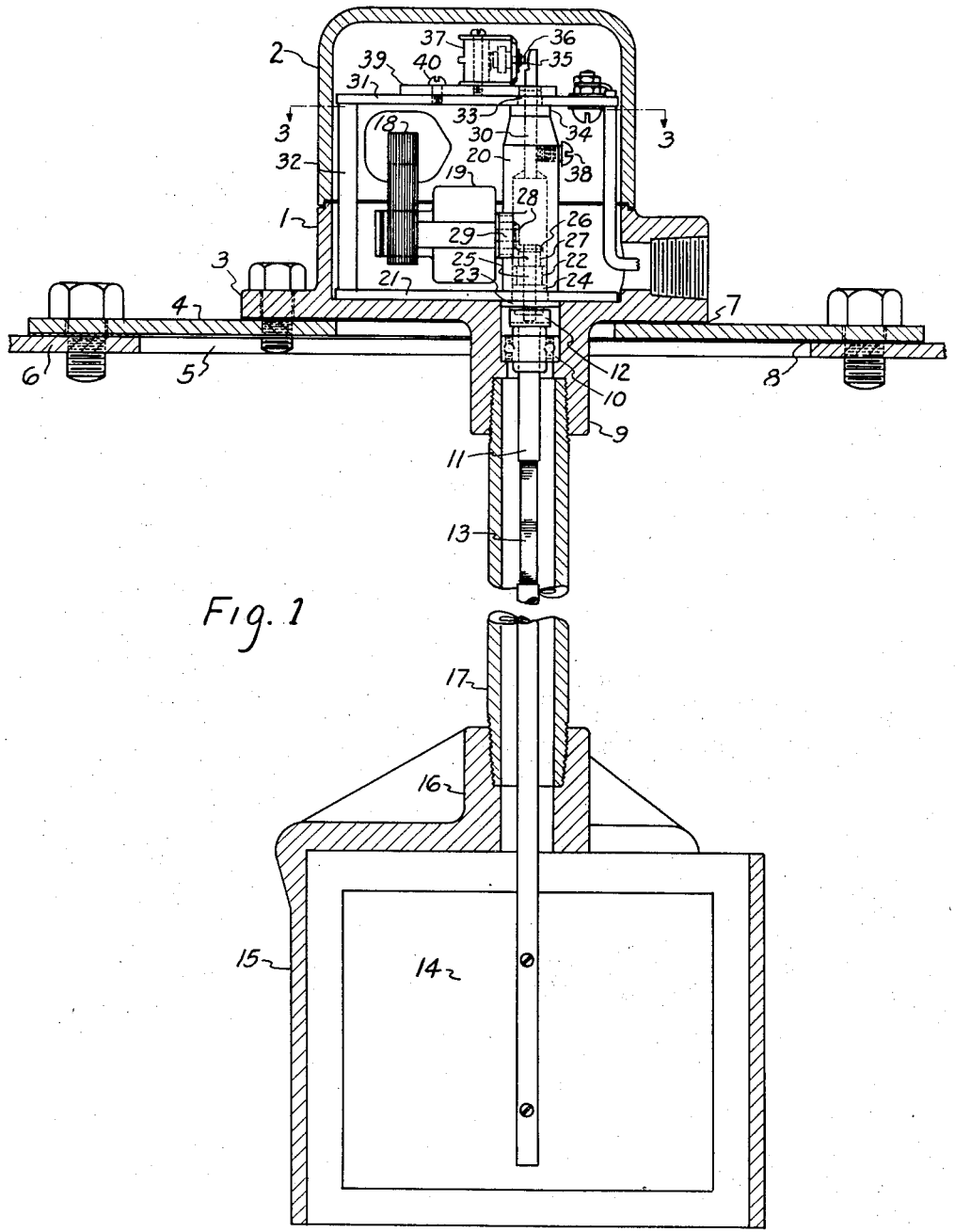
Fig. 1 is a vertical section.

Referring to the drawings, and first to Fig. 1, the apparatus will be seen to comprise a dust-proof casing 1, having a removable cover 2 and a flanged base 3, which may be secured to a plate 4 covering an opening 5 in the cover of a pulverulent material storage bin, represented generally at 6. The usual asbestos or other compressible gaskets 7 and 8 may be provided to prevent the escape of dust from the bin. The underside of the base is provided with a sleeve 9, having an internal shoulder to receive the outer race of an anti-friction bearing 10. The bearing is preferably of a dust-proof type and freely supports a hollow paddle shaft 11, the shaft terminating at its upper end in a slotted head member of a pin-type coupling 12, the head resting upon the inner race of bearing 10. A coupling of the pin or jaw type is preferred, to relieve the driving assembly of the weight of shaft 11, and to permit removal of the driving assembly without disturbing the shaft.

The shaft 11 preferably includes an intermediate flexible section 13, sweated into the shaft, to eliminate the necessity for a guide bearing near its lower end to prevent damage to bearing 10 by deflection of the shaft. A paddle 14 is secured to the lower end of shaft 11 and is preferably surrounded by a cylindrical housing 15, open at the top and bottom, to permit entrance and discharge of material. The housing 15 is supported by a web having a central, internally threaded sleeve 16 secured to a tube 17, the upper end of which is threaded into the sleeve 9. The housing 15 and tube 17 serve to protect the paddle and shaft against extreme deflection due to surging of the material.

The driving mechanism for the shaft 11 preferably comprises a self-starting synchronous motor having a vertically arranged stator frame 18, the rotor of the motor driving a conventional clock type speed reducer enclosed within the usual casing 19 which retains the lubricating oil and excludes dust. The motor and speed reducer form a unitary assembly of common type and need not be described in detail. This assembly is secured to a support 20, arranged for partial rotation about the axis of shaft 11. The lower end of support 20 rests upon a plate 21 preferably of wear resisting, insulating material such as "Bakelite", the plate having a circular opening to receive a forcibly fitted plug 22 having a flange 23 which bears against the under surface of the plate 21. The plug 22 is also provided with an annular shoulder 24 which serves as the lower guide bearing for the rotation of support 20. The plug 22 is bored centrally to form a bearing for shaft 25 the lower end of which carries the pin member of the pin-type coupling 12, the upper end of the shaft being secured to a miter gear 26, the hub-collar 27 of the gear resting upon the plug 22. The miter gear 26 is driven by miter gear 28 secured to the driven shaft 29 of the speed reducer 19.

The upper end of the support 20 is bored to receive a shaft 30 which passes through a plate 31, similar and parallel to the plate 21 and supported by posts 32. Shaft 30 turns in a bearing plug 33 forcibly fitted in an opening in the plate 31 and provided with a flange 34 which bears against the under surface of the plate.

Figure 2:
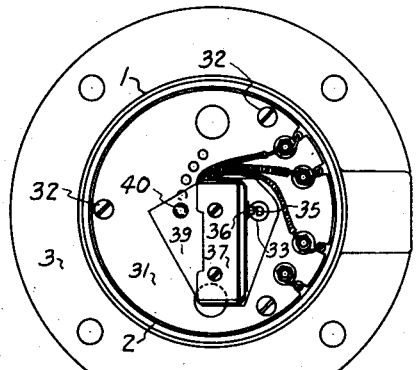
Fig. 2 is a plan view, with the cover of the casing removed.

The upper end of shaft 30 is provided with a cam surface 35 the rotation of which actuates a push-button 36 of a snap switch 37. The angular position of the cam is preferably made adjustable as by means of the set-screw 38 which secures shaft 30 within the bore of support 20. Switch 37 is preferably secured to a plate 39, the latter having an opening surrounding the plug 33, whereby the switch may be secured to the plate 31 at a desired angle to the cam surface 35, the plate 31 being provided with a plurality of threaded holes to receive the lag screw 40 as shown in Fig. 2, whereby the angular position of switch 37 may be adjusted to suit specific operating conditions.

Figure 3:
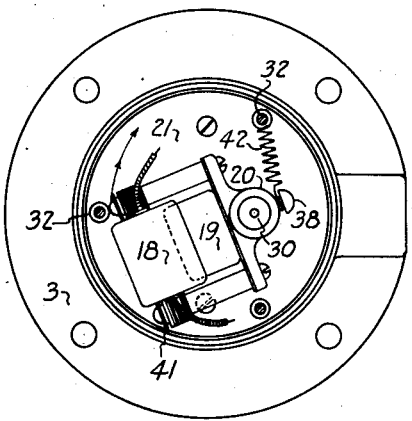
Fig. 3 is a plan on line 3—3 of Fig. 1.

When paddle shaft 11 and its gear 26 are arrested, the driving assembly is caused to revolve about the axis of the shaft by the continued rotation of gear 28. By reference to Fig. 3, it will be seen that the stator frame of the motor is held in an initial position against the wall of the casing at 41 by the opposition of a spring 42, one end of which may be conveniently secured to setscrew 38, and that the stator frame may revolve in the direction of the arrows, until it engages the inner wall of casing 1. In normal operation, however, the motor is de-energized before the stator frame reaches this maximum limiting point, as will be described hereinafter.

Figure 5:
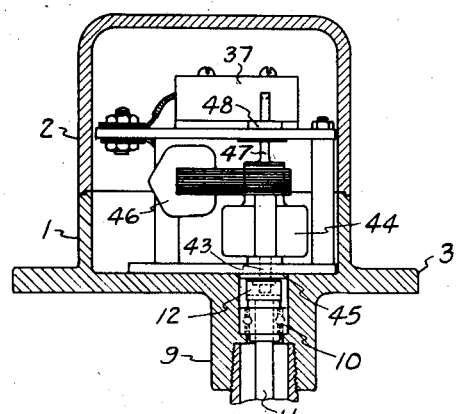
Fig. 5 is a fragmentary vertical section of a modified form of the apparatus employing a vertical motor.

The modified form of the apparatus, shown in Fig. 5, is generally similar, excepting that a vertical motor and built-in speed reducer is substituted, the driven shaft 43 of the speed reducer 44 being directly aligned and coupled with the paddle shaft 11. Driven shaft 43 passes through a bearing plug 45, upon which the speed reducer rests and turns with revolution of the stator frame 46, when the paddle shaft is arrested. The partial revolution of the stator frame is guided by a shaft 47 secured to the frame in alignment with the shaft 43, shaft 47 passing through a bearing plug 48, the shaft being provided with a cam surface to actuate switch 37.

The switch mechanism preferably includes at least a single pole double throw switch, whereby circuits may be opened and closed both before and after the switch is actuated, that is, prior to initial movement and after movement of the stator frame. By reference to Fig. 4, it will be seen that power may be supplied to terminals 50 and 51 connected to the field 52 of the motor through the pole 53 and initially closed contact 54 of switch 37. An additional terminal 55 may be provided whereby an additional circuit or circuits, such as one including signal lamps 56 may be completed at the same time.

Figure 4:
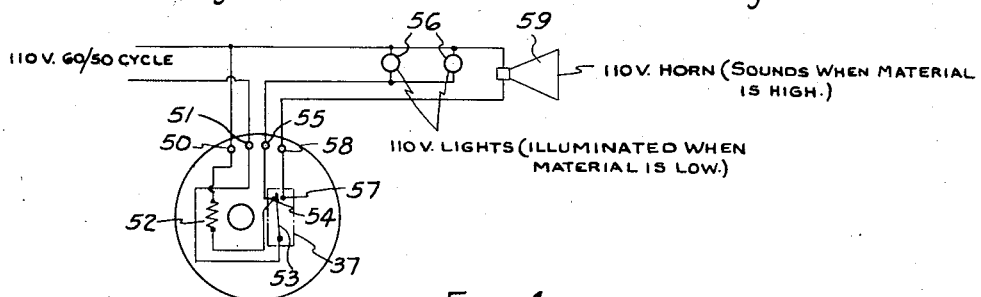
Fig. 4 is a schematic wiring diagram to illustrate a common use of the apparatus.

When the switch is actuated, the above circuits, including the motor, are de-energized and a circuit is completed through the contact 57 and terminal 58 to close a circuit through a warning signal, such as an electric horn 59. It is to be understood that the circuits described, with the exception of the motor circuit, are intended to be merely illustrative and that the apparatus may be employed generally to control the operation of conveyor motor starters; electrically controlled transport line valves, as illustrated in Fig. 4 of Morrow Patent No. 1,812,604, and the like.

The operation of the apparatus will be generally apparent from the foregoing. With especial reference to the preferred form of the apparatus, it will be seen that when the motor is energized, the paddle 14 rotates freely, and the stator frame 18 is held in its initial position by the opposition of spring 42 until the material level rises and buries the paddle. As the spring is adjusted for light tension, the size of the paddle is sufficient to arrest rotation of the shaft when the material level rises and buries the paddle. When this occurs, the stator frame together with the support 20 revolve about the axis of the paddle shaft 11, in opposition to the spring until the switch 37 is actuated, thereby de-energizing the motor, the stator frame remaining at this limit position until the level of material falls and releases the paddle, as the spring has not sufficient power to return the stator frame to the initial position, because of the extreme ratio of speed reduction.

The interval or lag between the time when the paddle 14 engages material and is arrested and the time when the switch is actuated may be regulated, as described previously, either by varying the angular position of the cam surface 35, the angular position of the plate 39, or both. The maximum interval obtainable is a function of the speed of the motor and speed reducer, in this case 1 R. P. M., and the arc through which the stator frame may revolve until movement is restrained by contact with the casing 1. With the parts arranged as shown in the drawings, the maximum interval is about ten seconds but it will be understood that by providing either for a greater arc, additional speed reduction, or both, that the interval may be increased, although ten seconds is sufficient to meet normal maximum practical conditions.

The interval selected depends upon the characteristics of the material and the rate at which it is delivered to the bin. If the material is highly aerated, a relatively long interval is desirable so that the paddle 14 will remain buried after settling has occurred. Likewise, when materials are delivered at a low rate a greater delay is desirable before the signal or conveyor operating circuits are affected in order to complete filling of the bin. This interval also serves to prevent premature actuation of the switch mechanism. If the materials tend to surge or splash and arrest the paddle momentarily, the stator frame revolves only to an intermediate point, between the established limiting points, and the spring returns it, without actuating the switch.

By providing means to regulate the interval, the necessity for providing paddle shafts of various lengths for high level indicators is eliminated. For normal commercial ranges in the relationship between conveyor capacity and available storage space, a shaft of sufficient length to support the bottom of paddle 14 about 24 inches below the bin cover has been found to be satisfactory. It is to be understood, however, that the length of the shaft may be increased to adapt the apparatus for low level indications and that ordinarily at least two indicators are used for each bin to give high and low indications respectively.

I claim:

1. An indicator for pulverulent material storage bins comprising the combination of a motor, means to support the stator frame for limited movement from an initial position, electrical switch mechanism actuated by movement of the stator frame from the initial position, and means to cause the stator frame to move, when the material reaches a predetermined level, comprising a shaft driven by the rotor and means secured to the shaft and adapted for location within a bin having a surface of sufficient size to arrest rotation of the shaft when the surface is buried in the material.

2. An indicator for pulverulent material storage bins comprising the combination of a self-starting electric motor, means to support the stator frame for limited movement from an initial position, electrical switch mechanism actuated by movement of the stator frame from the initial position, and means to cause the stator frame to move, when the material reaches a predetermined level, comprising a shaft driven by the rotor, and means secured to the shaft and adapted for location within a bin having a surface of sufficient size to arrest rotation of the shaft when the surface is buried in the material.

3. An indicator for pulverulent material storage bins comprising the combination of a self-starting electric motor, means to support the stator frame for limited movement from an initial position, means to oppose movement of the stator frame from said position, electrical switch mechanism actuated by movement of the stator frame from said position, and means to cause the stator frame to move, when the material reaches a predetermined level, including a shaft driven by the rotor, a paddle secured to the shaft and adapted for location within a bin, the paddle being of sufficient size to arrest rotation of the shaft when the paddle is buried in the material.

4. An indicator for pulverulent material storage bins comprising the combination of a self-starting electric motor, a shaft driven by the rotor, a paddle secured to the shaft and adapted for location within a bin, the paddle being of sufficient size to arrest rotation of the shaft when the paddle is buried in material, means to support the stator frame of the motor for limited turning movement around the axis of the shaft, means to oppose turning of the stator frame from an initial position when the shaft is free to rotate and to return the stator frame to the initial position when the material falls below the level of the paddle, and electrical switch mechanism actuated by movement of the stator frame.

5. An indicator for pulverulent material storage bins comprising the combination of a self-starting electric motor, a shaft driven by the rotor, a paddle secured to the shaft and adapted for location within a bin, the paddle being of sufficient size to arrest rotation of the shaft when the paddle is buried in material, the stator frame of the motor being supported for limited turning movement around the axis of the shaft, means to oppose turning of the stator frame from an initial position when the shaft is free to rotate and to return the stator frame to the initial position when the material falls below the level of the paddle, and electrical switch mechanism actuated by the stator frame after a predetermined turning movement thereof.

6. An indicator for pulverulent material storage bins comprising the combination of a self-starting electric motor, a shaft driven by the rotor, a paddle secured to the shaft and adapted for location within a bin, the paddle being of sufficient size to arrest rotation of the shaft when the paddle is buried in material, means to support the stator frame of the motor for limited turning movement around the axis of the shaft, means to oppose turning of the stator frame from an initial position when the shaft is free to rotate and to return the stator frame to the initial position when the material falls below the level of the paddle, electrical switch mechanism actuated by the stator frame upon movement thereof and means to adjust the length of the interval between the initial movement of the stator frame and the actuation of the switch mechanism.

7. An indicator for pulverulent material storage bins comprising the combination of a self-starting electric motor, a speed reducer driven by the rotor, a shaft driven through the speed reducer, a paddle secured to the shaft and adapted for location within a bin, the paddle being of sufficient size to arrest rotation of the shaft when the paddle is buried in material, the stator frame being supported for limited turning movement around the axis of the paddle shaft, means to oppose turning movement of the stator frame from an initial position when the shaft is free to rotate and to return the stator frame to the initial position when the material falls below the level of the paddle, and electrical switch mechanism actuated by the stator frame after it has moved a predetermined distance from its initial position, to provide an interval between the beginning of the movement and the actuation of the switch.

8. An indicator for pulverulent material storage bins comprising the combination of a self-starting synchronous motor provided with a speed reducer of a clock type secured to the stator frame, a shaft driven through the speed reducer and provided with a paddle adapted for location within a bin, the paddle being of sufficient size to arrest rotation of the shaft when the paddle is buried in material, means to support the stator frame and speed reducer for limited turning movement about the axis of the paddle shaft, means to oppose movement of the stator frame from an initial position when the shaft is free to rotate and to return it to the initial position when the material falls below the level of the paddle and switch mechanism actuated by movement of the stator frame after it has turned a predetermined distance from the initial position.

9. An indicator for pulverulent material storage bins comprising the combination of a self-starting synchronous motor provided with a speed reducer of a clock type secured to the stator frame, means to support the stator frame vertically and for partial revolution about a vertical axis, a vertical shaft located on said axis and driven through miter gears through the speed reducer, a paddle secured to the shaft and adapted for location within a bin, the paddle being of sufficient size to arrest rotation of the shaft when the paddle is buried in material, means to oppose movement of the stator frame from an initial position when the shaft is free to rotate and to return it to said position when the level of material falls below the paddle, and switch mechanism actuated by movement of the stator frame.

10. An indicator for pulverulent material storage bins comprising the combination of a self-starting synchronous motor provided with a speed reducer of a clock type secured to the stator frame, means to support the stator frame vertically and for partial revolution about a vertical axis, a vertical shaft located on said axis and driven through miter gears through the speed reducer, a paddle secured to the shaft and adapted for location within a bin, the paddle being of sufficient size to arrest rotation of the shaft when the paddle is buried in material, means to oppose the movement of the stator frame from an initial position when the shaft is free to rotate and to return it to said position when the level of material falls below the paddle, a switch, means to actuate the switch upon partial revolution of the stator frame including a cam movable with the stator frame, and means to adjust the position of the cam to vary the interval between the beginning of the movement of the stator frame and the actuation of the switch.

11. An indicator for pulverulent material storage bins comprising the combination of a self-starting synchronous motor provided with a speed reducer of a clock type secured to the stator frame, means to support the stator frame vertically for partial revolution about a vertical axis, a vertical shaft located on said axis and driven through miter gears through the speed reducer, a paddle secured to the shaft and adapted for location within a bin, the paddle being of sufficient size to arrest rotation of the shaft when the paddle is buried in material, means to oppose movement of the stator frame from an initial position when the shaft is free to rotate and to return it to said position when the level of material falls below the paddle, switch mechanism actuated by movement of the stator frame, and means to vary the position of the switch to vary the interval between the beginning of the movement of the stator frame and the actuation of the switch.

12. An indicator for pulverulent material storage bins comprising the combination of a self-starting electric motor, a speed reducer driven by the rotor and secured to the stator frame of the motor, a shaft driven through the speed reducer, a paddle secured to the shaft and adapted for location within a bin, the paddle being of sufficient size to arrest rotation of the shaft when the paddle is buried in material, the stator frame being supported for limited turning movement around the axis of the shaft, means to oppose turning movement of the stator frame from an initial position when the shaft is free to rotate and to return the stator frame to the initial position when the material falls below the level of the paddle, and electrical switch mechanism having contacts actuated by the stator frame both upon a predetermined movement and upon return to the initial position.

13. An indicator for pulverulent material storage bins comprising the combination of a self-starting electric motor, a speed reducer secured to the stator frame of the motor and having a horizontal driven shaft, means to support the stator frame vertically for partial revolution about a vertical axis, a vertical shaft on said axis, a miter gear on said shaft, a second miter gear meshing therewith and secured to the driven shaft, a paddle secured to the vertical shaft and adapted for location within a bin, the paddle being of sufficient size to arrest rotation of the shaft, means to oppose movement of the stator frame from an initial position when the vertical shaft is free to rotate but to permit the rotor of the motor to drive said second miter gear to move the stator frame when the paddle is buried in material and to return the frame to the initial position when the paddle is again free to rotate, and electrical switch means having contacts in the circuit of the motor actuated by the stator frame upon a predetermined movement from the initial position to open the circuit and to close the circuit when the stator frame returns to said position.

HERBERT S. LENHART.